United States Patent [19]
Allen et al.

[11] Patent Number: 6,054,995
[45] Date of Patent: Apr. 25, 2000

[54] ANIMATION CONTROL APPARATUS

[75] Inventors: Richard J. Allen, Redhill; Richard D. Gallery, Horley, both of United Kingdom

[73] Assignee: U.S. Philips Corporation, New York, N.Y.

[21] Appl. No.: 08/700,910

[22] Filed: Aug. 21, 1996

[30]     Foreign Application Priority Data

Aug. 21, 1995 [GB] United Kingdom .................... 9517115

[51] Int. Cl.⁷ ................................................. G06T 17/00
[52] U.S. Cl. ............................................................ 345/433
[58] Field of Search .................................. 345/433–440, 345/473–475

[56]             References Cited

U.S. PATENT DOCUMENTS 5,511,158   4/1996   Sims ....................................... 345/440

OTHER PUBLICATIONS

T.W. Calvert et al, "The Evolution of an Interface For Choreographers", InterChi '93, Apr. 24–29, 1993, pp. 115–122.

M. Graham et al, "Simulating and Implementing Agents and Multiple Agent Systems", Proc. European Simulation Multiconference, 1991, pp. 226–231.

R.A. Brooks, "The Behavior Language; User's Guide", Massachusetts Institute of Technology Artificial Intelligence Laboratory, A.I. Memo 1227, Apr. 1990, pp. 1–35.

*Primary Examiner*—Almis R. Jankus
*Attorney, Agent, or Firm*—Gregory L. Thorne

[57]                 ABSTRACT

A method and apparatus are described for controlling a computer-generated animation suite (32), where the suite generates sequences of image frames from stored libraries of image components and component motion parameters. An interface (42) includes a store (44) of function specifications each of which, when called and applied to the animation suite, initiates one or a predetermined sequence of image component movements. A rule-based processor (10) comprises means for modelling an asynchronous logic circuit as a plurality of circuit elements the functions of which are governed by a stored set (14,22) of rules each defining a response to a given condition with the processor generating a response when the associated condition is satisfied. Predetermined conjunctions of image frame features are specified as the condition portion of some of the rules, and the calling of each of the interface function specifications is the response portion of a respective rule. A method and apparatus for the control of a motion simulation suite are also described.

19 Claims, 4 Drawing Sheets

| Command | Variables | Function |
|---|---|---|
| Create | Skeleton | Creates a new figure |
| Delete | Figure | Deletes the given figure |
| Set Sequence | Figure, Sequence, Offset (n), (Warp) | Sets the sequence for a given figure |
| Set Loop Mode | Figure, Loop | Specifies whether the current sequence loops |
| Set Warp Factor | Figure, Warp | Sets the time warp factor |
| Advance Time | Figure, Offset (n) | Advances the position of the current sequence |
| Display | Figure | Draws the figure for the current sequence position |
| Bounds | Figure, Position | Calculates the bounding box for the current sequence position |
| Get Position | Figure | Calculates the current position of the figure in world space |
| Get Orientation | Figure | Calculates the current orientation of the figure in world space |
| Get Pose | Figure | Calculates the current pose of the figure |
| Set Position | Figure, Position | Sets the current position of the figure in world space |
| Set Orientation | Figure, Orientation | Sets the current orientation of the figure in world space |

FIG. 5

ANIMATION CONTROL APPARATUS

DESCRIPTION

The present invention relates to the generation of animated sequences by animation suites assembling those images from libraries of prestored components. In particular, the invention relates to a method and apparatus for enabling real-time interactive control of sequences of animated graphical images in an animated display, and to a method and apparatus for the control and monitoring of generated sequences of body part motions.

For the displayed case, the animation may comprise a simple two-dimensional cartoon with a largely static background over which characters are moved, with the character appearance over successive frames being called up from a library of stored character poses. Where the character executes a repetitive action, for example walking across the screen, the suite may store the successive poses required for the walking action as a sequence to be looped, with associated updating of the character screen position.

In a more complex animation, whether displayed or just modelled in terms of related component movements, the subject (image) may be a three-dimensional model of, for example, a human or animal body. Again however, the basic body part shapes and movement sequences thereof are prestored and may be called up as required. An example of such an animation suite is "Life Forms", a compositional tool for the creation of dance choreography, developed by the Simon Fraser University, B.C. Canada and marketed in various forms through Kinetic Effects Incorporated. Note that "Life Forms" is a trade mark of Kinetic Effects Inc. of Seattle, USA, and all uses of the term herein acknowledge the fact. The development of "Life Forms" is described in a paper entitled "The Evolution of an Interface for Choreographers" by T. W. Calvert and others from SFU, presented at InterChi '93, Apr. 24–29 1993.

In order to improve the realism of animations and simulations, it has been proposed to apply artificial intelligence (AI) techniques to control of the animations to make them more reactive to constraints of the virtual world within which they are modelled. Rule-based languages have been suggested as advantageous due to their facility for modelling constraint relationships.

Rule-based processor systems typically support behaviour languages in which behaviours are either simple operations performed on a value, or rules, where a rule defines logical and temporal relations between events (behaviour state changes). Accordingly, events associated with the condition portion of a rule (also known as the left hand side behaviours of a rule) cause subsequent events associated with the response portion (right hand side behaviour) of the rule. An example of such a rule-based real time language is Real Time ABLE (RTA), described in Proceedings of the European Simulation Multiconference 1991 at pages 226–231. ABLE stands for Agent Behaviour LanguagE and is a highly concurrent production rule language for simulating agents and multiple agent systems. ABLE provides for tighter integration of time with the production rule system. The language may conveniently be compiled into a representation of a virtual asynchronous logic circuit which comprises a number of interconnected elements such as AND elements, OR elements, delay elements and so on. RTA uses a propagation technique as opposed to a search strategy to obtain a fast production rule system. A further example of a rule-based language is given in "The Behaviour Language; User's Guide" by R A Brooks, AI Memo 1227, Massachusetts Institute of Technology Artificial Intelligence Laboratory, April 1990.

A problem which arises with the use of propagating rule-based systems is that of coordinating the event driven switching of rules and constraints with the more synchronous nature of the selection/rendering/display sequence of the animation generation.

It is therefore an object of the present invention to enable control of an animation or simulation suite by a rule-based processor system, whilst minimising discontinuities due to the differing timing systems.

In accordance with a first aspect of the present invention there is provided apparatus for controlling a computer-generated animation suite, the suite comprising stored libraries of image components and component motion parameters and means for generating sequences of image frames through which one or more of the image components are moved in accordance with one or more of the motion parameters, the apparatus comprising: interface means connectable to the image generating means and including storage means holding a library of function specifications each of which, when called and applied to the image generating means, initiates one or a predetermined sequence of image component movements; and a propagating rule-based processor connected to the interface means and containing a set of rules each defining a response to a given condition with the processor generating a response when the associated condition is satisfied; wherein the processor is coupled to receive data relating to one or more features of a generated image frame, said data satisfying the condition portion of at least one rule, and wherein the calling of each of the interface function specifications is the response portion of a respective rule.

In order to avoid synchronisation problems, timing management means are preferably provided to initiate generation of each successive image frame by the animation suite following initiation and completion of a predetermined period of rule firing propagation in the rule-based processor. For real time operation of the animation suite, the timing management means may suitably be arranged to initiate generation of successive image frames at a substantially constant frequency such as 30 frames per second.

In accordance with a second aspect of the present invention there is provided apparatus for controlling a computer-generated simulation suite, the suite comprising stored libraries of body components and component relative motion parameters and means for generating motion sequences for one or more of the body components in which the components are moved in accordance with one or more of the motion parameters, the apparatus comprising: interface means connectable to the sequence generating means and including storage means holding a library of function specifications each of which, when called and applied to the image generating means, initiates one or a predetermined sequence of body component movements; and a propagating rule-based processor connected to the interface means and containing a set of rules each defining a response to a given condition with the processor generating a response when the associated condition is satisfied; wherein the processor is coupled to receive data relating to one or more features of a body component during a motion sequence, which data satisfies the condition portion of at least one rule, and wherein the calling of each of the interface function specifications is the response portion of a respective rule.

Suitably, the data to the processor is received via the interface means and specifies one or more predetermined conjunctions of image or body component features, and the propagating rule-based processor is suitably of a type comprising means for modelling an asynchronous logic circuit as a plurality of circuit elements the functions of which are governed by the set of rules (for example a processor supporting an RTA rule-set).

The apparatus according to either aspect of the invention preferably includes user interface means, connected to the rule-based processor, by use of which a user may selectively modify the set of rules, or may selectively call one or more of the interface function specifications, the processor holding a subset of the rules each having a respective one of the interface function specifications as their respective response portion and each having a different predetermined user input as their respective condition portion.

Also in accordance with the first and second aspects of the present invention there are provided methods for controlling an animation suite and a simulation suite respectively, as defined in the attached claims to which reference should now be made.

Further features and advantages of the present invention will become apparent from reading of the following description of preferred embodiments of the present invention, given by way of example only, and with reference to the accompanying drawings in which:

FIG. 5 is a table listing commands of a function set held by the interface unit of FIG. 1.

FIG. 1 shows apparatus embodying the present invention providing an interfacing link between a rule-based processor containing a population of RTA rules and an animation suite modelling a human form and its movements. Through the interfacing link, the processor is enabled to control a basic set of features associated with a single or multi-character animation.

Figure 1:
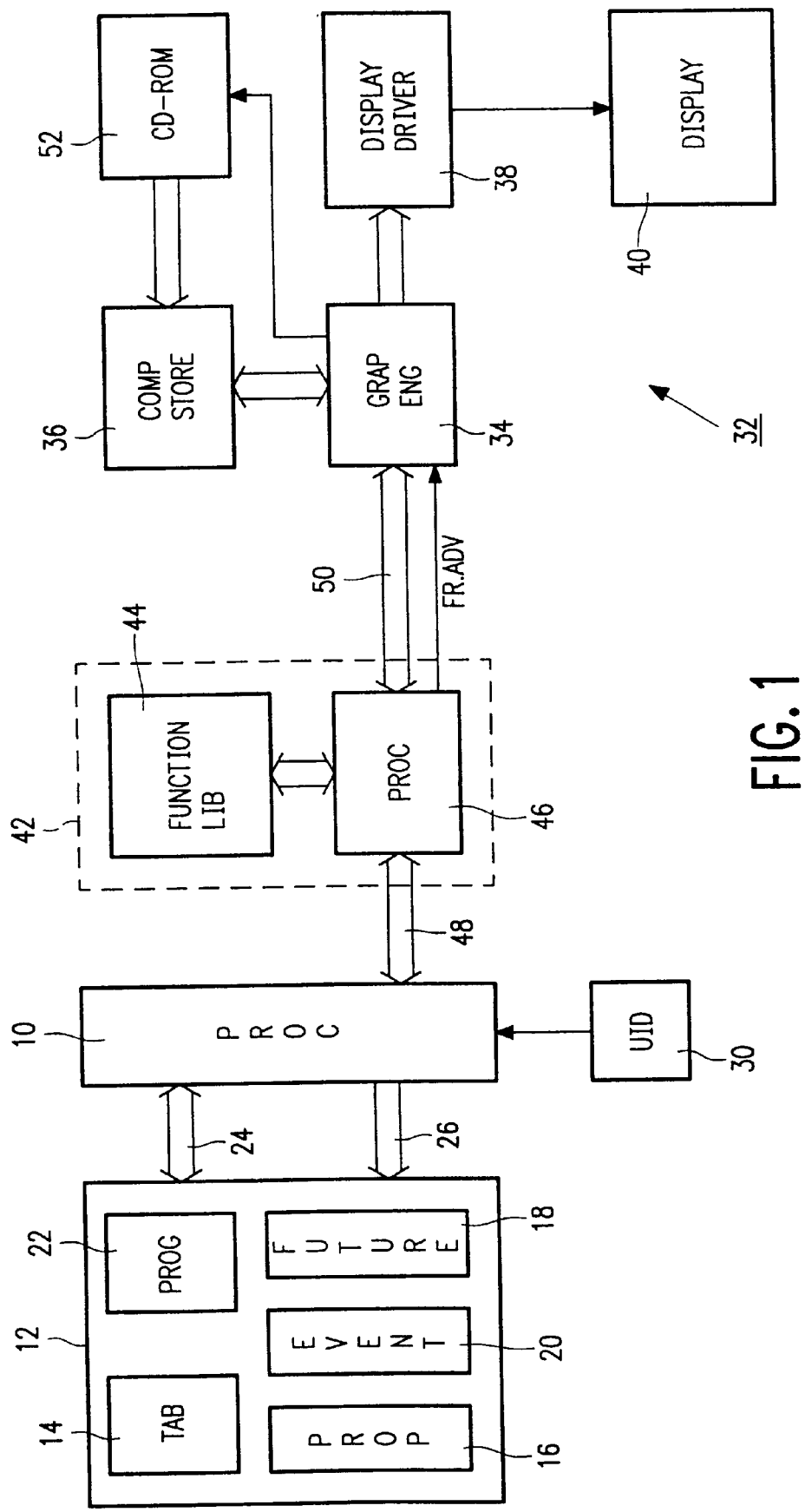
FIG. 1 is a block schematic diagram of a rule-based processor and animation suite linked by an interface unit embodying the present invention.

The rule-based processor 10 has associated with it a random access memory (RAM) 12 which provides a number of discrete storage areas, a first of which 14 holds a table containing details of the various elements of the asynchronous logic circuit representation of the compiled population of RTA rules. Each of the behaviours (register elements), time annotations (delay elements) logic function elements and rules has a row in the table. Each row in the table identifies the element number, a state flag of the device, a queued status flag of the device, the internal status, and a propagate function start address. When the state of the element to which the row of the table relates changes (referred to herein as an event), a propagate function is executed to effect any appropriate changes to all of the elements which may be affected by such a change. These propagate functions are conveniently arranged at certain memory locations or start addresses. Changing the state of elements by propagation in such a manner rather than by searching for all of the elements affected by an event allows the apparatus to operate efficiently.

The propagate functions starting at the start addresses are stored in another area 16 of the RAM 12; the RAM also provides further storage areas for future element state changes 18, an event stack 20, and a program store 22. The program store 22 holds the set of rules for an agent, each in the form of at least one specific behaviour defining a condition and at least one further behaviour defining the associated response. The program store 22 and the propagate functions 16 could, if desired, be stored in another memory device, for example a read only memory.

The RAM 12 is connected to the processor 10 by a data bus 24 and an address bus 26 in known manner. Also in known manner, a clock (CLK) 28 is connected to the processor. The processor 10 operates on the agent rules from program store 22 responding to the satisfaction of condition behaviours by generating one or more further behaviours defining the associated response. A user interface device (UID) 30 enables input of control data and commands as will be described.

The storage area 18 for future agent element state changes is arranged as a two row table containing a plurality of time slots and element numbers. Any number of elements numbers can be stored to correspond to a particular time slot and the states of these elements will all be changed during that time slot. The table may be arranged for a consecutive sequence of time slots, but it is preferred to use a stack containing only those time slots for which element numbers are stored, with the facility to insert element numbers and time slots as required due to operation of the program.

Generally, all of an agent's element state changes except those corresponding to delay elements will be executed in the current time slot although other element state changes can be also delayed if desired. Those element state changes which are to occur without a time delay may be placed in the event stack 20 for execution in the near future—i.e. later in the current time slot, but before moving to the next time slot for which an event is specified.

The animation suite, indicated generally at 32, comprises a graphics engine, a component store 36, and a display driver 38 which outputs a signal for display on monitor/CRT 40. The component store 36 provides short term memory for current frame or sequence generation and holds the relevant image component and movement parameter information called up from mass storage 52 which may be, for example, a CD-ROM store. In an alternative embodiment (to be described), the animation suite may also have a user interface and clock source: in the embodiment shown, however, these functions are handled via an interface unit 42 linking the suite to the rule-based processor.

In operation, the animation suite generates images by initially selecting a skeleton (wire frame model) from a library of skeletons held in component store 36 and determining its initial position and orientation within the virtual world. Where the skeleton is of an articulated nature, for example when modelling the human body, the determination may be a staged process starting with the angles of the various joints to produce an initial pose and then positioning and orienting the posed skeleton within the virtual world. The final stage is to "flesh out" the skeleton which may be done by conventional rendering techniques or by fitting of surfaces from the component store 36.

In order to provide for control of the suite by the rule-based processor 10, the interface unit 42 maintains a function set in a memory 44 accessed by a local processor 46, which processor is connected via respective data buses 48,50 to the rule-based processor 10 and the graphics engine 34. The interface unit processor 46 links each of the functions to the control set of the graphics engine 34, such that each specifies a particular operation or sequence of operations to be performed by the suite when called. Where a sequence is specified, it may apply to a whole "body" or to components thereof; in the human body example, this would allow one sequence to specify a walking motion for the legs with another specifying a swinging movement of the arms, which sequences may be run independently of each other.

The control set functions also provide 'handles' for the rule-based processor, enabling the implementation of a function to be specified as the response portion of a rule, such that the rules define a relationship between user input and real-time playback of an animated sequence. By applying constraint functions of the rule-based system, relationships can also be specified between actions of an animated character and features of the virtual world in which it is modelled and also between the actions of two or more separately modelled characters.

Figure 2:
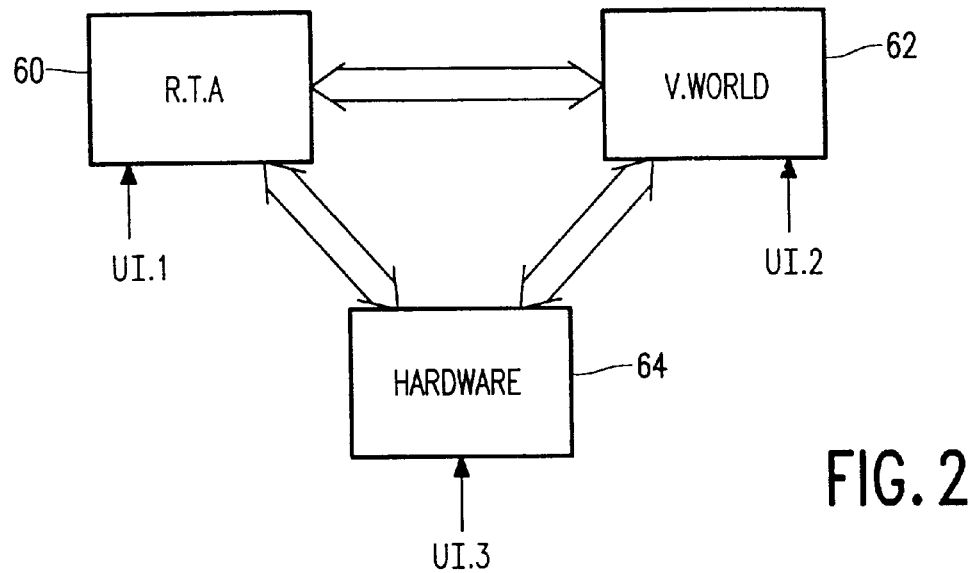
FIG. 2 is a schematic representation of user interface options in relation to apparatus such as that of FIG. 1.

The UID may take various forms depending on the form and level of interaction required and, rather than reading directly into the rule-based processor as shown in FIG. 1, it may be connected to the graphics engine of the animation suite or interfaced directly to the RTA program store. FIG. 2 schematically represents the link between an RTA rule set 60, the virtual world 62 in which the animation is generated, and the hardware 64 handling the generation of images. The user input may be to each one of the three stages (indicated by UI.1, UI.2, and UI.3) or combinations thereof depending on the application.

Input UI.1 to the RTA rule set would enable control of the animated character in terms of how it reacts to constraints imposed by the virtual world. Input UI.2 to the virtual world would enable control and alteration of the feature with which the animated character interacts on the basis of the RTA rule set. Input UI.3 to the hardware would allow variation in the appearance of the animated character by control of the operation of rendering the images.

The physical construction of the UID would also depend on the form of interaction and control, and may range from a mouse or joystick, through keypads or keyboards, to a sensor array allowing modelling of physical objects in the virtual world.

Figure 3:
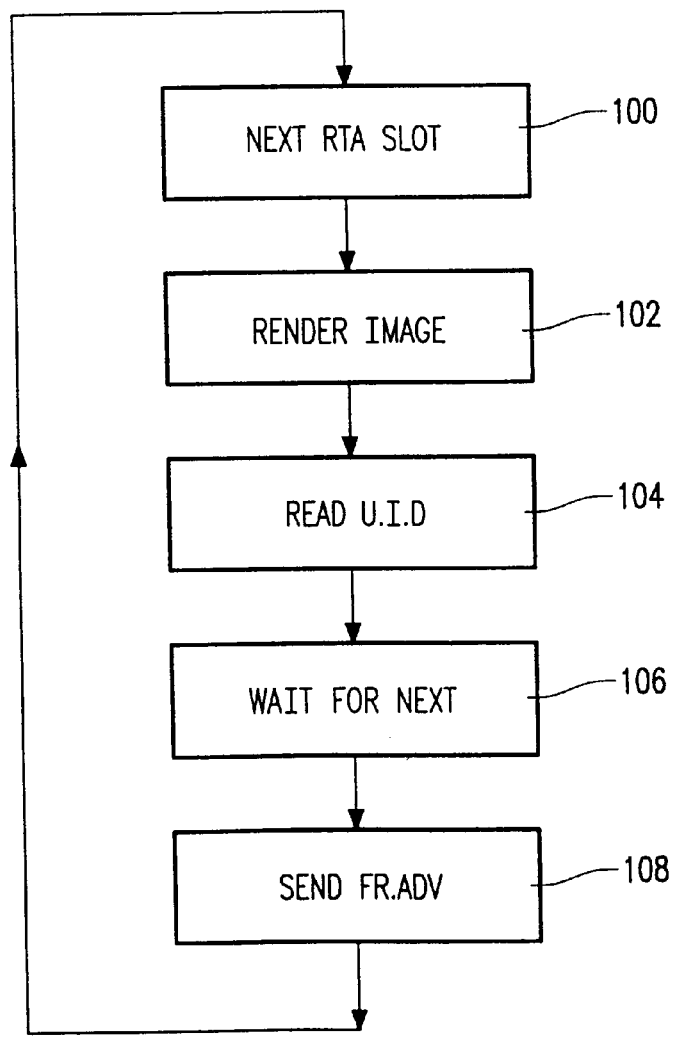
FIG. 3 is a flow chart illustrating timing management in the apparatus of FIG. 1.

The timing control of the RTA and animation program is as shown by the flow chart of FIG. 3. Initially, the RTA time slot is incremented (100) such that rule firings due to condition changes since the last time slot (as well as those queued for that particular time slot) can begin to propagate through the rule set. Next, at 102, the image frame based on the called-up functions from the previous propagation time slot is calculated, rendered, and displayed. Once this has occurred, the user interface is checked (104) and any newly-entered commands or data are logged for handling during the next RTA propagation slot. The timer then waits (at 106) until a predetermined time and then (at 108) it sends a frame advance signal to the animation suite. The timing control then loops back to the first process of initiating the next RTA propagation slot.

For real-time running of an animation, the frame advance signal is preferably of a substantially constant frequency (such as 30 frames/sec). By controlling the frame advance in dependence on the RTA propagation, however, slower frame updates may be accommodated where particularly complex rule constraints or image details exist. Alternatively, for applications where RTA propagation time plus generation and rendering time will always be less than one frame period, the frame advance signal may be generated as a periodic signal by a clock within the animation suite, with the steps of initiating an RTA propagation slot and checking for user input being synchronised to this.

Figure 4:
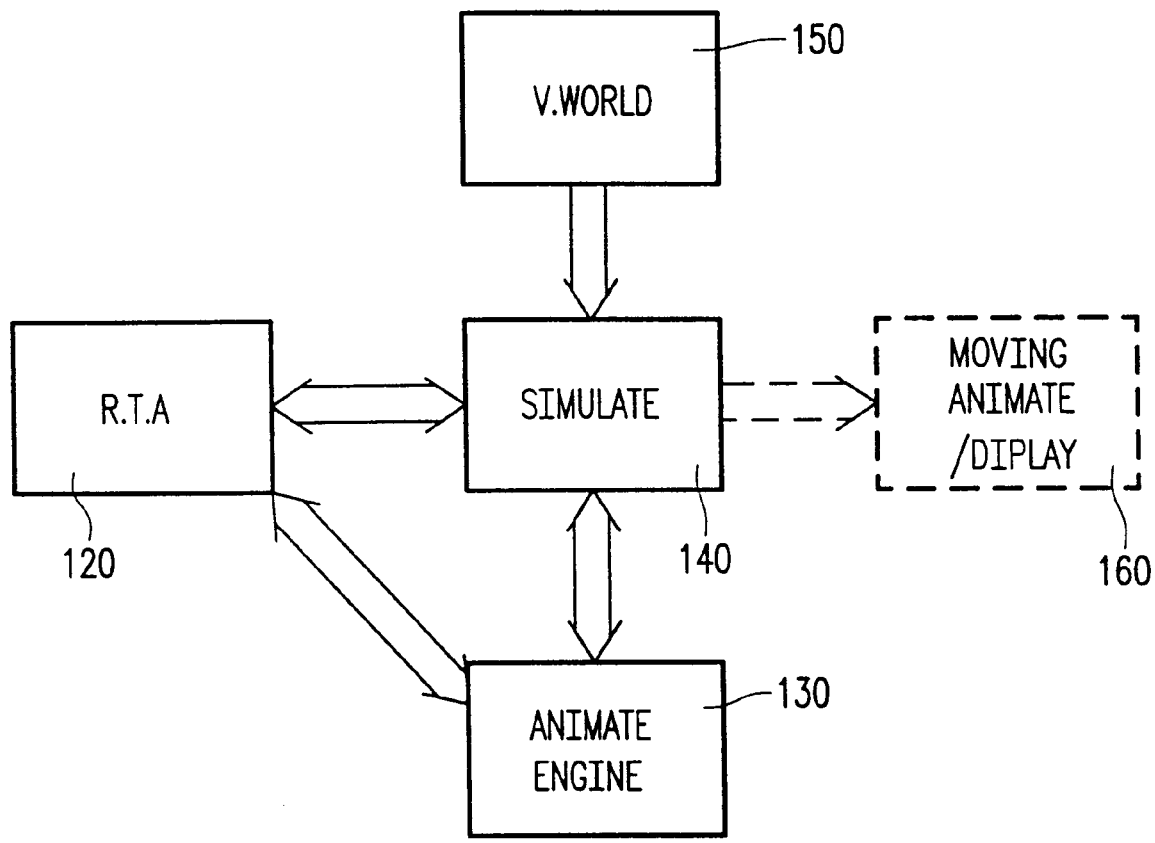
FIG. 4 is a schematic representation of the components of a simulation suite arrangement according to an alternative embodiment of the invention.

In an alternative embodiment, the system may be concerned specifically with the inter-relationships between the moving body components and the full rendition of the graphical images may not be required. In this case, the generalised system arrangement may be as shown in FIG. 4, with an RTA rule population 120, body component animation engine 130 and simulation suite connected together, and with the simulation suite further being coupled to a model of the virtual world 150. As shown in dashed outline, a graphics engine 160 might be provided to display the output from the simulation suite.

The contents of the function set will to some extent be dependent on the form of animation. The table of FIG. 5 gives a non-exhaustive list of preferred commands for a function set where the animation suite is generating a sequence of frames modelling the movement of a three-dimensional body within a three-dimensional virtual world. The implementation of these commands is as follows:

Create: This creates a new figure based on an identified one of a stored library of skeletons (wire frame models). The response to this command should be an identification ("Figure") for the new figure.

Delete: Deletes the identified figure.

Set Sequence: This specifies a movement sequence for a given figure, with the sequence to commence n frames from the current frame. If no offset is specified, any currently active sequence is replaced by the new sequence, although an "interrupt" period is preferably provided to enable interpolation between the figure pose and position at the interrupt and that at the start of the new sequence. A time warp factor (see below) may also be specified.

Set Loop Mode: This indicates whether a current sequence for a given figure is to be looped (for example a walking action) or whether it is just to be played through once.

Set Warp Factor: This specifies an extended or reduced period over which the current sequence is to be played out. If it has the capability, this may be handled by the graphics engine interpolating intermediate frames based on specified ones. Alternatively, the warp may be handled in RTA by either changing the time annotations of individual rules or by speeding up the entire rule population, that is to say by increasing the frequency at which the successive RTA time periods are called.

Advance Time: This advances the position of the current sequence by n frames.

Display: This calls the graphics engine to render a frame for the current figure position within the sequence.

Bounds: This calculates a boundary box in three-dimensions around the figure in its position at the current frame of the sequence.

Get Position: This calculates the current position of the figure within the virtual world; this is particularly useful where the character has been following a lengthy sequence.

Get Orientation: This calculates the current orientation of the figure within the virtual world (i.e. which way the figure is facing).

Get Pose: This calculates the current pose of the figure, that is to say the position and orientation of the various body components in relation to one another.

Set Position: This allows positioning of the figure within the virtual world.

Set Orientation: This allows orienting of the figure at a specified position within the virtual world.

As will be appreciated, many more functions may be specified depending on the particular application. For example, functions would generally be required for initialisation of the system and data loading, and may also be required for diagnostic functions.

From reading the present disclosure, other modifications and variations will be apparent to persons skilled in the art. Such modifications and variations may involve other features which are already known in the art and which may be used instead of or in addition to features already described herein. For example, whilst shown in FIG. 1 as two separate devices, it will be recognised that the rule-based processor 10 and interface processor 46 may be a single device, although preferably with multi-tasking capability. Additionally, although FIG. 1 shows local mass storage 52 for image component details and a local store 22 for the rule population, it will be understood that either or both may be supplied from remote storage over, for example, a data network with the animation suite and/or rule-based processor being provided with a suitable interface to that network.

Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

We claim:

1. Apparatus for controlling a computer-generated animation suite, the suite comprising stored libraries of image components and component motion parameters within a three-dimensional virtual world and means for generating sequences of image frames through which one or more of the image components are moved in accordance with one or more of the motion parameters, the apparatus comprising:

interface means connectable to the image generating means and including storage means holding a library of function specifications each of which, when called and applied to the image generating means, initiates one or a predetermined sequence of image component movements within the three-dimensional virtual world; and a propagating rule-based processor connected to the interface means and containing a set of rules each defining a response to a given condition with the processor generating a response and an instantaneous orientation of a generated image frame when the associated condition is satisfied;

wherein the processor is coupled to receive data relating to one or more features of said generated image frame, said data satisfying the condition portion of at least one rule, and wherein the calling of each of the interface function specifications is the response portion of a respective rule.

2. Apparatus as claimed in claim 1, wherein said data is received via the interface means and specifies one or more predetermined conjunctions of image frame features.

3. Apparatus as claimed in claim 1, wherein said propagating rule-based processor comprises means for modelling an asynchronous logic circuit as a plurality of circuit elements the functions of which are governed by said set of rules.

4. Apparatus as claimed in claim 1, further comprising user interface means, connected to the rule-based processor, by use of which a user may selectively modify the set of rules.

5. Apparatus as claimed in claim 1, further comprising user interface means, connected to the rule-based processor, by use of which a user may selectively call one or more of the interface function specifications, the processor holding a subset of the rules each having a respective one of the interface function specifications as their respective response portion and each having a different predetermined user input as their respective condition portion.

6. Apparatus as claimed in claim 1, further comprising timing management means arranged to initiate generation of each successive image frame by the animation suite following initiation and completion of a predetermined period of rule firing propagation in the rule-based processor.

7. Apparatus as claimed in claim 6, wherein the timing management means is arranged to initiate generation of successive image frames at a substantially constant frequency.

8. Apparatus for controlling a computer-generated simulation suite, the suite comprising stored libraries of body components and component relative motion parameters within a three-dimensional virtual world and means for generating motion sequences for one or more of the body components in which the components are moved in accordance with one or more of the motion parameters, the apparatus comprising:

interface means connectable to the sequence generating means and including storage means holding a library of function specifications each of which, when called and applied to the image generating means, initiates one or a predetermined sequence of body component movements within the three-dimensional virtual world; and a propagating rule-based processor connected to the interface means and containing a set of rules each defining a response to a given condition with the processor generating a response response and an instantaneous orientation of the body components when the associated condition is satisfied;

wherein the processor is coupled to receive data relating to one or more features of a body component during a motion sequence, which data satisfies the condition portion of at least one rule, and wherein the calling of each of the interface function specifications is the response portion of a respective rule.

9. Apparatus as claimed in claim 8, wherein said data is received via the interface means and specifies one or more predetermined conjunctions of body component features.

10. Apparatus as claimed in claim 8, wherein said propagating rule-based processor comprises means for modelling an asynchronous logic circuit as a plurality of circuit elements the functions of which are governed by said set of rules.

11. Apparatus as claimed in claim 8, further comprising user interface means, connected to the rule-based processor, by use of which a user may selectively modify the set of rules.

12. Apparatus as claimed in claim 8, further comprising user interface means, connected to the rule-based processor, by use of which a user may selectively call one or more of the interface function specifications, the processor holding a subset of the rules each having a respective one of the interface function specifications as their respective response portion and each having a different predetermined user input as their respective condition portion.

13. A method of controlling a computer-generated animation suite, the suite comprising stored libraries of image components and component motion parameters within a three-dimensional virtual world and means for generating sequences of image frames through which one or more of the image components are moved in accordance with one or more of the motion parameters, the method comprising:

providing a library of function specifications each of which, when called and applied to the image generating means, initiates one or a predetermined sequence of image component movements within the three-dimensional virtual world; and providing a propagating rule-based processor containing a set of rules each defining a response to a given condition with the processor generating a response and an instantaneous orientation of the image components when the associated condition is satisfied;

wherein data relating to one or more predetermined image frame features comprises the condition portion of at least one rule, and wherein the calling of each of the library of function specifications is the response portion of a respective rule.

14. A method as claimed in claim 13, wherein said data is received from the animation suite and specifies one or more predetermined conjunctions of image frame features.

15. A method as claimed in claim 14, wherein the or one of the predetermined conjunctions specifies a proximity or range of proximity values between two image components.

16. A method of controlling a computer-generated simulation suite, the suite comprising stored libraries of body components and component relative motion parameters within a three-dimensional virtual world and means for generating motion sequences for one or more of the body components in which the components are moved in accordance with one or more of the motion parameters, the method comprising:

providing a library of function specifications each of which, when called and applied to the sequence generating means, initiates one or a predetermined sequence of body component movements within the three-dimensional virtual world; and providing a propagating rule-based processor containing a set of rules each defining a response to a given condition with the processor generating a response and an instantaneous orientation of the body components when the associated condition is satisfied;

wherein data relating to one or more body component features during a motion sequence satisfies the condition portion of at least one rule, and wherein the calling of each of the library of function specifications is the response portion of a respective rule.

17. A method as claimed in claim 16, wherein said data is received from the simulation suite and specifies one or more predetermined conjunctions of body component features.

18. A method as claimed in claim 16, wherein the simulation suite models motion of two or more body components within a three-dimensional virtual world and the information output in response to the calling of one of the further library of function specifications specifies an instantaneous relative orientation of said at least two body components.

19. A method as claimed in claim 16, wherein the simulation suite models motion of two or more body components within a three-dimensional virtual world and the information output in response to the calling of one of the further library of function specifications specifies an instantaneous relative orientation of said at least two body components.

* * * * *